US010175851B2

(12) United States Patent
Sengupta et al.

(10) Patent No.: US 10,175,851 B2
(45) Date of Patent: Jan. 8, 2019

(54) METHODS, MANAGEMENT SERVERS, AND COMPUTER PROGRAM PRODUCTS FOR MANAGING NETWORK DEVICES

(71) Applicant: Telefonaktiebolaget L M Ericsson (publ), Stockholm (SE)

(72) Inventors: Rohit Sengupta, Kolkata (IN); Anuraag Chowdhary, Hisar (IN); Amit Mittal, Dehli (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 955 days.

(21) Appl. No.: 14/183,906

(22) Filed: Feb. 19, 2014

(65) Prior Publication Data
US 2015/0236899 A1 Aug. 20, 2015

(51) Int. Cl.
G06F 15/173 (2006.01)
G06F 3/0482 (2013.01)
H04L 12/24 (2006.01)

(52) U.S. Cl.
CPC ........ G06F 3/0482 (2013.01); H04L 41/0233 (2013.01); H04L 41/0879 (2013.01); H04L 41/22 (2013.01)

(58) Field of Classification Search
None
See application file for complete search history.

(56) References Cited

U.S. PATENT DOCUMENTS

| 6,259,446 | B1* | 7/2001 | Matheny | G06F 3/0481 |
| | | | | 715/764 |
| 6,343,320 | B1* | 1/2002 | Fairchild | H04L 41/0213 |
| | | | | 709/224 |
| 6,405,310 | B1* | 6/2002 | Simpson | G06F 9/4411 |
| | | | | 709/208 |
| 6,490,617 | B1* | 12/2002 | Hemphill | H04L 41/0213 |
| | | | | 709/223 |
| 6,631,407 | B1* | 10/2003 | Mukaiyama | H04L 41/0213 |
| | | | | 709/203 |
| 2001/0052006 | A1* | 12/2001 | Barker | H04L 41/0213 |
| | | | | 709/223 |
| 2002/0091859 | A1* | 7/2002 | Tuomenoksa | H04L 12/4641 |
| | | | | 709/245 |

(Continued)

Primary Examiner — Phyllis A Book
(74) Attorney, Agent, or Firm — Rothwell, Figg, Ernst & Manbeck, p.c.

(57) ABSTRACT

This disclosure describes a method for managing a network device. The method includes a management server transmitting to an object server a request message comprising information about the network device and receiving a management object from the object server. The method includes the management server receiving the management object, where the management object comprises: i) information identifying a device management action and ii) a command string for use in commanding the network device to perform the device management action. After receiving the management object, the method includes the management server displaying an action menu comprising a menu item associated with the network device and with the device management action. The method further includes the management server receiving an indication of selection of the menu item. The method also includes the management server, after receiving the indication, transmitting to the network device the command string.

21 Claims, 7 Drawing Sheets

(56) References Cited

U.S. PATENT DOCUMENTS

| | | | |
|---|---|---|---|
| 2003/0135593 A1* | 7/2003 | Lee | H04L 41/22 |
| | | | 709/223 |
| 2004/0002943 A1* | 1/2004 | Merrill | H04L 41/0893 |
| 2004/0109454 A1* | 6/2004 | Sahinoja | H04L 69/329 |
| | | | 370/395.5 |
| 2006/0036721 A1* | 2/2006 | Zhao | H04L 67/025 |
| | | | 709/223 |
| 2008/0021991 A1* | 1/2008 | Kawai | H04L 12/24 |
| | | | 709/223 |
| 2008/0307319 A1* | 12/2008 | Iwata | G06K 15/007 |
| | | | 715/748 |
| 2011/0040829 A1* | 2/2011 | Lee | H04L 67/125 |
| | | | 709/203 |
| 2013/0219297 A1* | 8/2013 | Soundararajan | G06F 8/38 |
| | | | 715/752 |

* cited by examiner

| OBID (Primary Key) | Action | DN | Name | Description | Specifics | Version |
|---|---|---|---|---|---|---|
| 12312 | Add | root,Ericsson,NSS,CS,H LR | AP25 | Initiate Backup | Commands | 1 |
| 12313 | Modify | root,Ericsson,NSS,CS,H LR | AP2 | Restore Backup | Commands/Automated-Procedure | N+1 |

FIG. 5

METHODS, MANAGEMENT SERVERS, AND COMPUTER PROGRAM PRODUCTS FOR MANAGING NETWORK DEVICES

TECHNICAL FIELD

This disclosure relates to methods, management servers, and computer program products for managing network devices (i.e., devices connected to a network, such as, but not limited to, a telecommunications network).

BACKGROUND

A telecommunications network, such as a radio access network and core network, contains numerous network devices, such as telecommunication devices, from possibly numerous device manufacturers. Typically, each network device has an Operation and Maintenance (O&M) component that allows users (e.g., the network operators) to maintain and configure the network device. Some network devices come with simple O&M functionality, and some with more complex or "dangerous" functionality (i.e., all possible "changes" allowed). An example of a "dangerous" function is an open Linux shell with which users can make numerous changes and even inadvertently change OS parameters and hence, cause an outage. In most cases, each network device has an O&M component that was created by the manufacturer of the device. Thus, it is possible that many of the network devices within a communication network have different O&M components that operate and function differently.

Network operators all around the world are looking for O&M solutions from equipment manufacturers that are easy to maintain and operate. With networks getting more and more complex, serviceability and operability of products and solutions are taking center stage. Network operators do not desire to retain teams of high competent O&M resources because that is not their focus area, and they are happy to pass on complex technical issues to the equipment manufacturers. However, the daily operation of the network devices and their maintenance (e.g., backup/upgrade/update/configuration/performance audits, etc.) are usually performed by network operators themselves.

Network operators are looking for simple, general, and low cost solutions in this area. A general solution may be a solution that works for each of a network operator's network devices from all vendors. For example, a general solution may be a single O&M platform for Ericsson, Alcatel-Lucent (ALU), Huawei, Nokia-Solutions and Networks (NSN) covering all or most of their products or solutions. In absence of such solutions, a network operator who has equipment from multiple vendors in multiple technology areas (e.g., RAN, Core, IN, 2G, 3G, 4G, MPBN, etc.) needs to have a team of O&M engineers having competence in each of these different types of vendor equipment and technology, which is clearly not cost effective.

Network device manufacturers are also investing more in their research and development organizations to develop "easy-to-maintain" network devices, which is time consuming as well as cost intensive. In addition to these disadvantages, even if the equipment manufacturers manage to provide "easy-to-maintain" solutions, which are very difficult to accomplish, the network operators will still have difficulty in handling different tools for different network devices from different vendors.

In today's telecommunication networks, telecommunication network operators have different telecommunication devices belonging to different platforms and from different equipment manufacturers. The sheer number of such telecommunication devices is quite substantial. As described above, each of these different telecommunication devices may have its own unique O&M mechanism. The equipment manufacturers can try to provide an "easy-to-maintain" solution, but even these "easy-to-maintain" solutions in most cases would be unique or non-generic, which is problematic for network operators.

For example, discrete O&M solutions for different network devices are usually device based (i.e., each make of device having a unique O&M mechanism). Accordingly, network operators have difficulty managing O&M solutions based on the sheer amount of network devices managed by the network operators. Furthermore, equipment manufacturers are burdened with the additional time and cost of development and maintenance for "easy-to-maintain" O&M solutions (usually this is of the lowest priority).

Moreover, network operators have additional cost for retaining a team of O&M engineers having and/or developing knowledge in each of these discrete O&M solutions of the products/solutions the network operator owns. Furthermore, O&M engineers of network operators or of various lower-level after-sale support organizations in the equipment manufacturers need to have knowledge of each of these different O&M solutions, which also has a cost overhead by virtue of training and development. Additionally, Multi-Vendor Managed Services (MVMS), which is a very important solution in services portfolio of several telecom players are having difficulty in providing support and O&M services to the equipment of different vendors for the same reason.

SUMMARY

This disclosure provides methods, management servers, and computer program products that aim to overcome at least some of the above identified problems. Specifically, this disclosure provides methods, management servers, and computer program products that aim to make it easy and simple for network operators to manage the various different network devices within their network. As used herein, a "network device" is any device connected (indirectly or directly) to a network that can send and/or receive data from another device connected to the network. Examples of network devices include: telecommunication devices (e.g., routers, switches, base stations, gateways, etc.), automated teller machines (ATMs), monitoring devices (e.g., utility meter), network appliances (e.g., refrigerators), networked home security systems, cameras, etc.

In some embodiments, a method for managing a network device includes a management server (which may comprise one or more computers) transmitting to an object server a request message. The request message comprises information about the network device (e.g., information identifying the make and/or model of the network device). The object server is configured such that, after receiving the request message, the object server uses the information about the network device to retrieve a management object and transmits to the management server the management object. The management server receives the management object, wherein the management object comprises: i) information identifying a device management action and ii) a script comprising command string for use in commanding the network device to perform the identified device management action. After receiving the management object, the management server displays to a user an action menu comprising a menu item associated with the network device and with the script for use in commanding the network device to perform the identified device management action. The management server receives an indication that the user selected the menu item. The management server, after receiving the indication that the user selected the menu item, transmits to the network device the command string.

In some embodiments, the method further comprises the management server receiving a second management object, the second management object comprising: i) information identifying a second device management action and ii) a second script comprising a second command string for use in commanding the network device to perform the identified second device management action. In response to receiving the second management object, the management server adds to the action menu a second menu item associated with the network device and with the second script. The management server receives an second indication that a user selected the second menu item. The management server, in response to receiving the second indication, transmitting to the network device the second command string.

In some embodiments, the method further comprises the management server displaying an object creation menu for creating a user specified object associated with the network device; the management server receiving one or more command strings for inclusion in the user specified object; and the management server transmitting the user specified object to the object server.

In some embodiments, the management server displays a selectable user interface element associated with the network device, and displays the action menu in response to a selection of the user interface element.

In some embodiments, the received management object further comprises a protocol identifier identifying a communication protocol. In such embodiments, the command string is transmitted to the network device using the communication protocol specified by the protocol identifier included in the management object.

In some embodiments, the management object further comprises a TCP port number and an expected prompt string. In such embodiments, the method may further comprise the management server, in response to receiving the indication that the user selected the menu item, transmitting a TCP connection request to the network device to establish a TCP connection with an application running on the network device, the TCP connection request comprising the TCP port number. The management server may receive, over the TCP connection and from the application, a prompt string. The management server compares the received prompt string with the expected prompt string to determine if they are identical. As a result of determining that the received prompt string is identical to the expected prompt string, the management server transmitting the command string over the TCP connection to the application running on the network server.

In some embodiments, the application is configured to execute an operation identified by the command string and transmit a positive acknowledgement string back to the management server in response to successfully executing the operation. In such embodiments, the method may further comprise the management server comparing received positive acknowledgement string to an expected positive acknowledgement string included in the management object to determine whether the operation was successfully performed.

In some embodiments, a management server for managing a network device comprises a processor and a computer readable medium coupled to the processor. The computer readable medium contains instructions executable by the processor. The management server is operative to transmit to an object server a request message comprising information about the network device. The object server is configured such that, in response to the request message, the object server uses the information about the network device to retrieve a management object and transmits to the management server the management object. The management server is further operative to receive the management object, wherein the management object comprises: i) information identifying a device management action and ii) a command string for use in commanding the network device to perform the device management action. The management server is further operative to receive an indication that the user selected the menu item. The management server is further operative to, after receiving the indication, transmit to the network device the command string.

In some embodiments, a computer product for managing a network device, comprises a non-transitory computer readable medium storing computer instructions for implementing any of the methods described herein.

BRIEF DESCRIPTION OF THE DRAWINGS

The accompanying drawings, which are incorporated herein and form part of the specification, illustrate various embodiments.

FIG. 5 illustrates an exemplary database entry for an object according to some embodiments.

DETAILED DESCRIPTION

Embodiments are directed to methods, management servers and computer program products that enable a network operator to manage its various network devices without the network operator needing to have expertise in the operation and maintenance of its network devices, and the network device manufacturers need not invest substantial time and/or capital on development of sophisticated "easy-to-maintain" solutions. The embodiments described herein aim to be generic (i.e., work for all products, for all platforms, and for all vendors).

Figure 1:
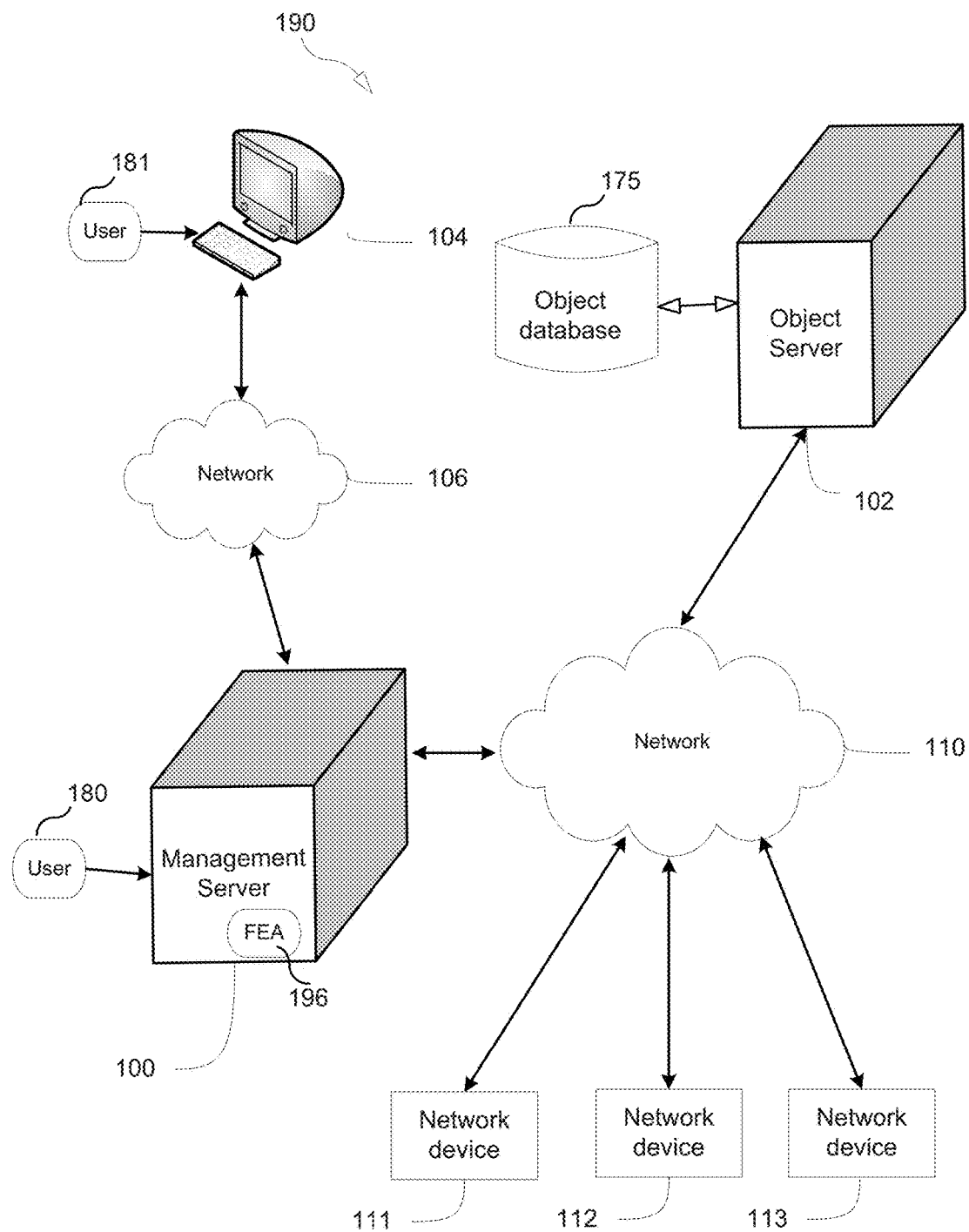
FIG. 1 illustrates an exemplary computer topology diagram according to some embodiments.

FIG. 1 illustrates a system 190 according to some embodiments. System 190 includes a management server 100, which may be directly accessed by a user 180 or indirectly accessed by a remote user 181 using a terminal 104 and network 106. The management server 100 may be connected to an object server 102 via network 110 for downloading management objects ("MOBs") stored in an object database 175 managed by the object server 102 (object database 175 may be a component of object server 102 or may be a separate component that is accessible to object server via, for example, a network). A MOB is a structured set of information that can be used to cause a network device to perform an O&M operation. Additionally, the management server 100 may be connected to network devices 111, 112, and 113. The management server 100 may use MOBs obtained from object server 102 to manage the network devices 111-113.

Networks 104 and 110 may be any type of network known to one of ordinary skill in the art (i.e., IP network) for enabling communication between network devices 111-113 and management server 100, between servers 100 and 102, and between terminal 104 and management server 100.

In some embodiments, a front end application (FEA) is included in the management server 100. The FEA may be a command line interface (CLI) based solution or a graphical user interface (GUI) or a combination of both. A user (user 180 or 181) interacts with the FEA to instruct management server 100 to perform desired O&M operations with respect to a network device (e.g., network device 111) including, but limited to: checking alarms, taking backup of the network device, restoring from backup, upgrades/updates, basic/semi-advanced health-check of the network device, KPI monitoring and analysis (which can be tailor made for specific operators), eagle eye view of the network (including their inter connectivity and status), identify congestions and preempt potential network emergencies (proactive maintenance), basic configuration (adding/removing trunks, defining routes, etc.)

It is understood by one of ordinary skill in the art that O&M operations are not limited these above listed operations and may extend to any O&M operation known to one of ordinary skill in the art. As illustrated above, these O&M operations include three pillars of O&M activities, namely: performance management (PM), fault management (FM), and configuration management (CM). In some embodiments, each of these O&M operations are tied to one or more MOBs. MOB, as an example, an MOB may comprise a script for causing the management server 100 to transmit to an O&M client application running on the network device 111 one or more command strings defined in the script, which command string(s) cause the O&M client application perform a particular O&M operation (e.g., restore backup).

The object database 175 may be built up (i.e., populated) with MOBs for various network devices from various manufacturers. MOBs may be provided by the manufacturer or vendor of a network device during a product development phase, by support professionals during a product support phase, or a product maintenance phase. The object server 102 provides database capabilities where an entry is associated with a stored MOB. These MOBs may be manually fed to the object server 102 using a predefined format, or the object server 102 may be enabled to learn from usage where a particular activity can be saved as an MOB. The MOBs, which may comprise a set of commands or a procedure usually found in customized O&M GUIs, may be entered into the object database 175 for specific products by respective equipment manufacturers.

In some embodiments, there is an interface between the management server 100 and object server 102. This interface may be implemented between the FEA 196 of management server 100 and object server 102 via network 110. This interface may be implemented by any suitable communication protocol, such as, but not limited to, the Light Weight Directory Access Protocol (LDAP). An advantage of LDAP is that LDAP is a fast and light way of reading from and writing to databases (e.g., MySQL). The users 180, 181 of management server 100 can indirectly access the object server 102 via management server 100. That is, for example, users 180, 181 can instruct management server 100 to send to object server 102 an MOB and an instruction to store the MOB in object database 175. In other embodiments, object server 102 provides to other users (e.g., user 182) a front end application with a "write" access so that users 182 can add MOBs into object database 175.

In some embodiments, there is an interface between the FEA 196 and the network devices 111, 112, 113, which interface defines the connectivity between FEA 196 and the network devices it needs to service. This interface may be implemented between the FEA 196 and anyone of network devices 111-113 via network 110. Generally, this interface is not hard-coded since different network devices may have different O&M interface protocols implemented over them. Accordingly, a MOB for a particular network device may include information identifying O&M connectivity protocols to be used (e.g., Telnet, SSH, SNMP, etc.) together with their port number and any other parameters for implementing the protocol. The connectivity protocols may also work over TCP/IP, where both the interfaces should be connected via TCP/IP.

Figure 2:
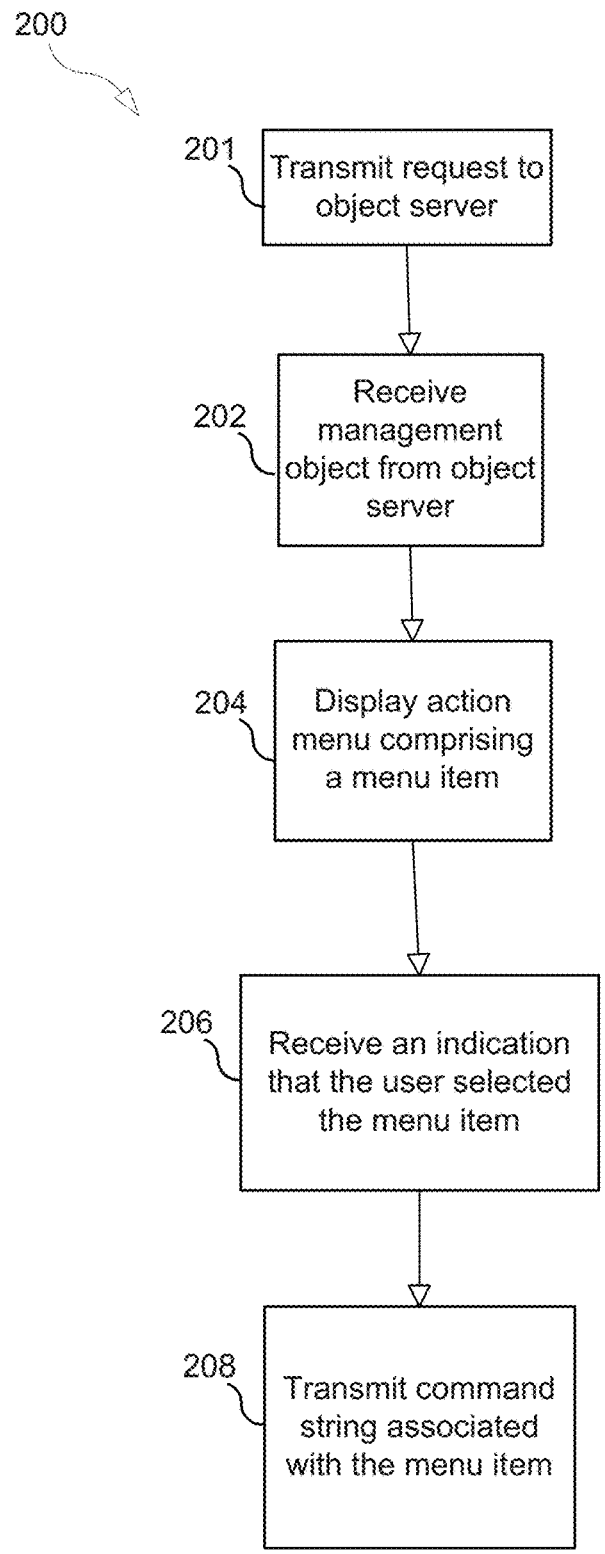
FIG. 2 illustrates an exemplary flow chart according to some embodiments.

FIG. 2 illustrates an embodiment of a process 200 performed by the management server 100. The process 200 may generally start at step 201 where the management server 100 transmits a request message to object server 102. For example, a user at the management server 100 may access the FEA 196 and submit a search request message (e.g., an LDAP query) for anyone of network devices 111-113. The request message sent to object server 102 includes, in some embodiments, information about a network device. In some embodiments, the information about the network device comprises information identifying the make of the network device (i.e., information identifying the manufacturer of the network device and/or information identifying the trade name of the network device) and/or information identifying the model of the network device.

In some embodiments, the object server 102 is configured such that, in response to the request message, the object server 102 uses the information about the network device to retrieve a set of one or more MOBs and transmits to the management server 100 the retrieved MOB(s). For example, in the case that the request message is an LDAP search request message, upon receiving the request message, the object server 102 retrieves one or more MOBs associated with search terms specified in the LDAP search request.

In step 202, the management server 100 receives a MOB sent from object server 102 in response to the request message. In some embodiments, the received MOB, comprises i) information identifying a device management action and ii) a script comprising (or consisting of) a command string for use in commanding the network device to perform the identified device management action.

Figure 6:
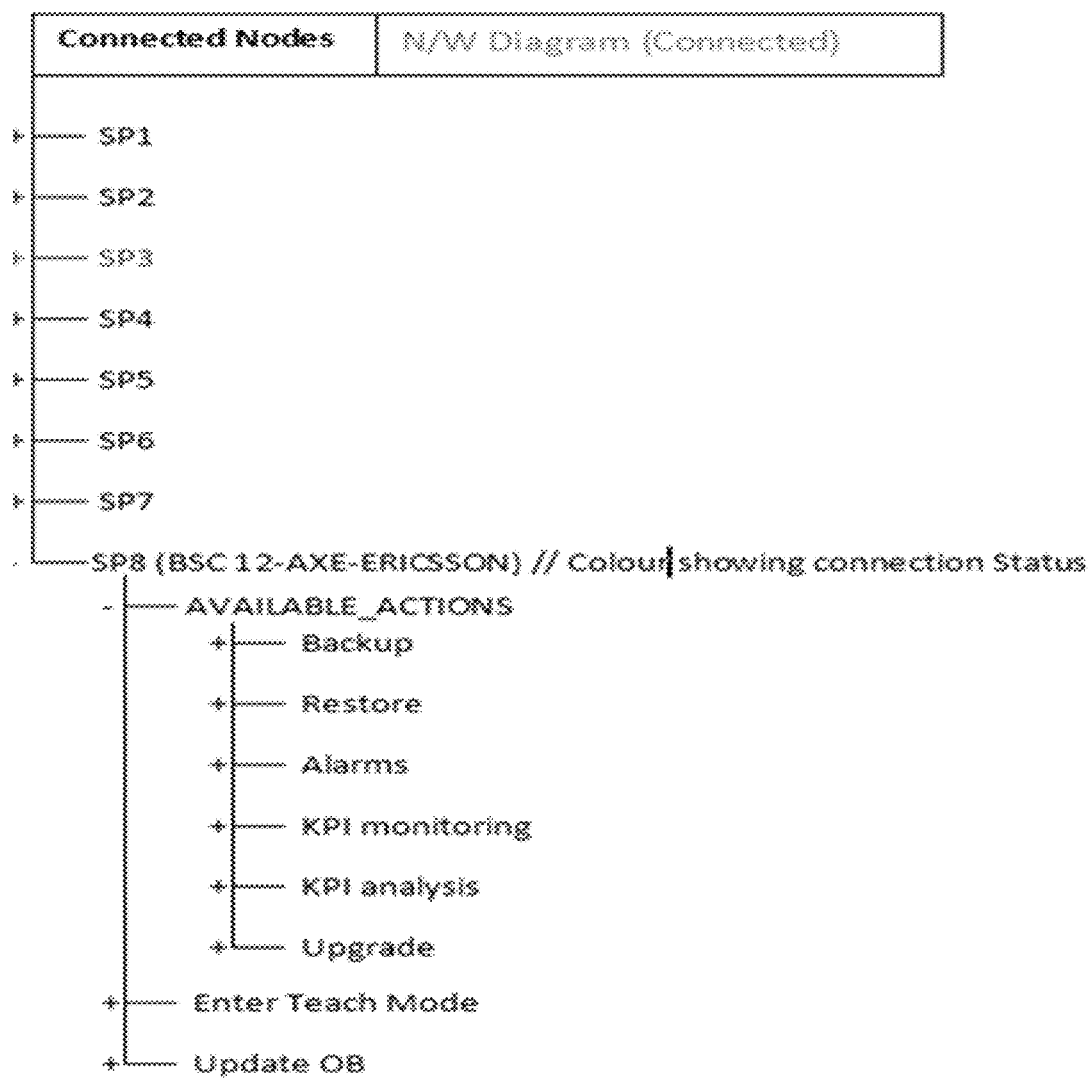
FIG. 6 illustrates an exemplary menu according to some embodiments.

In step 204, the management server 100 displays an action menu comprising a menu item associated with the network device and with the script for use in command the network device to perform the identified device management action. That is, for example, management server 100 uses the information in the received MOB to create the action menu. For instance, whenever management server 100 receives a new MOB for a particular network device, management server 100 may add to an action menu for the network device a new menu item that is then associated with a script included in the new MOB. In this way, management server 100 can dynamically create an action menu. Referring to FIG. 6, FIG. 6 illustrates an example action menu 600 that may be displayed in step 204. Action menu 600 comprises a set of menu items associated with a network device named "SP8". In the illustrated example, action menu 600, which is labeled "Available_Actions," includes a set of menu items where each menu item is associated with the network device named "SP8" and with a device management action. For instance, menu item 602 is associated with network device "SP8" and the device management action labeled "Backup." In embodiments where the user is a remote user (e.g., user 181), management server 100 displays to the remote user 181 the action menu by transmitting to terminal 104 a document (e.g., an HTML document) that causes terminal 104 to display the action menu. When the action menus is displayed to the user the user may select a menu item associated with a particular network device and with a particular device management action.

In some embodiments, management server 100 displays a selectable user interface element (e.g., a selectable icon) associated with the network device and displays the action menu in response to a user selecting the selectable user interface element.

In step 206, management server 100 receives an indication that a user has selected the menu item associated with the network device and with the script for use in command the network device to perform the identified device management action. For example, management server 100 may receive from terminal 104 a message that includes information identifying the menu item.

In step 208, the management server 100 transmits the command string included in the script associated with the selected menu item to the network device. In some embodiments, the received MOB further comprises a protocol identifier identifying a communication protocol, and management server 100 transmits the command string to the network device using the communication protocol specified by the protocol identifier.

As described above, if, for example, TCP is the identified protocol, the MOB may further include a TCP port number as well as other information (e.g., an expected prompt string), and management server 100 (e.g., FEA 196) will first establish a TCP connection with an application running on the network device that is listening for incoming connection requests (i.e., "SYN" packets). Upon the connection being established, the application running on the network device may send a prompt string over the connection to management server 100. The script may instruct the management server 100 to compare the prompt string received over the connection to the expected prompt string included in the received MOB to determine if they are identical. If the received prompt string is identical to the expected prompt string, then, as a result of that determination, the script instructs management server 100 to transmit the command string over the connection to the application. The application is configured to execute an operation identified by the command string and transmit a positive acknowledgement string back to the management server 100 in response to successfully executing the operation. The script may instruct the management server 100 to compare the received positive acknowledgement string to an expected positive acknowledgement string included in the MOB to determine whether the operation was successfully performed.

In this way, a user can manage the network device without having to know any of the commands for management the device. That is, management server 100, based on MOBs it receives from object server 102, can, for example, construct an action menu having a menu item associated with a particular network device and a particular script for causing the network device to perform a specific operation (e.g., a configuration operation), and a user of management server 100 merely needs to select the menu item in order to cause the network device to perform the specific operation because the management server 100 will "run" the script (e.g., send the command string to the network device) automatically in response to the user selecting the menu item.

Process 200 can be performed for other network devices manufactured by other manufacturers. In this way, management server 100 is configured to enable a user to manage various network devices of various makes and models.

Figure 3:
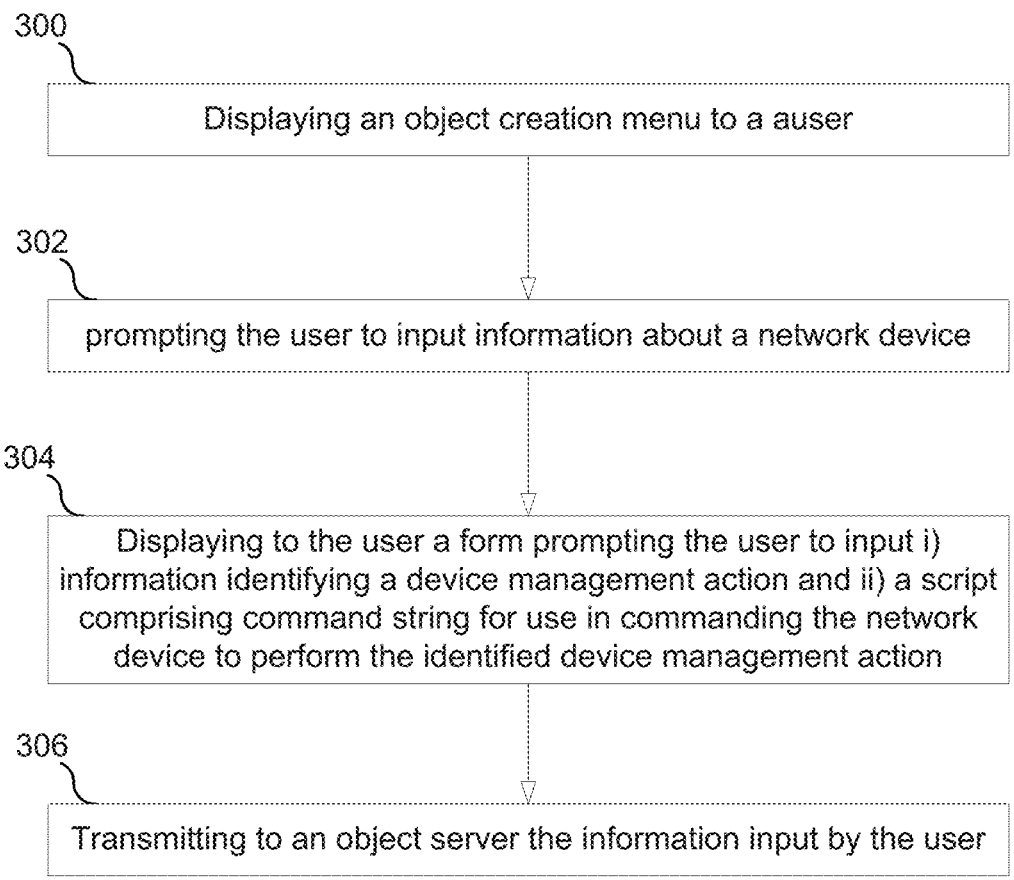
FIG. 3. illustrates an exemplary flow chart according to some embodiments.

FIG. 3 illustrates an embodiment of another process performed by the management server 100. The process may start at step 300 where the management server 100 displays an object creation menu to a user (e.g., user 180 or 181). The object creation menu may include a first menu item for creating a new MOB for a particular network device (e.g., a particular type of router manufactured by Router, Co.) and a second menu item for modifying an existing MOB. For the sake of illustration we, will assume the user selected the first menu item (create a new MOB). In step 302, management server 100 prompts the user to input information about a network device (e.g., prompts the user to input make and/or model information for a network device, such as the trade name of the network device or the name of the manufacturer of the network device). In step 304, management server 100 displays to a user a form prompting the user to input i) information identifying a device management action and ii) a script comprising command string for use in commanding the network device to perform the identified device management action. For example, when creating or modifying an MOB, the user may be provided with an editor window in which the user enters a script or a pointer to a script (e.g., the pathname of a script). In step 306, the management server 100 transmits to the object server 102 the information entered by the user. The object server 102, then stores the received information in object database 175. For example, object server 102 may create a new object record within database 175 and store the received information in the object record.

Figure 4:
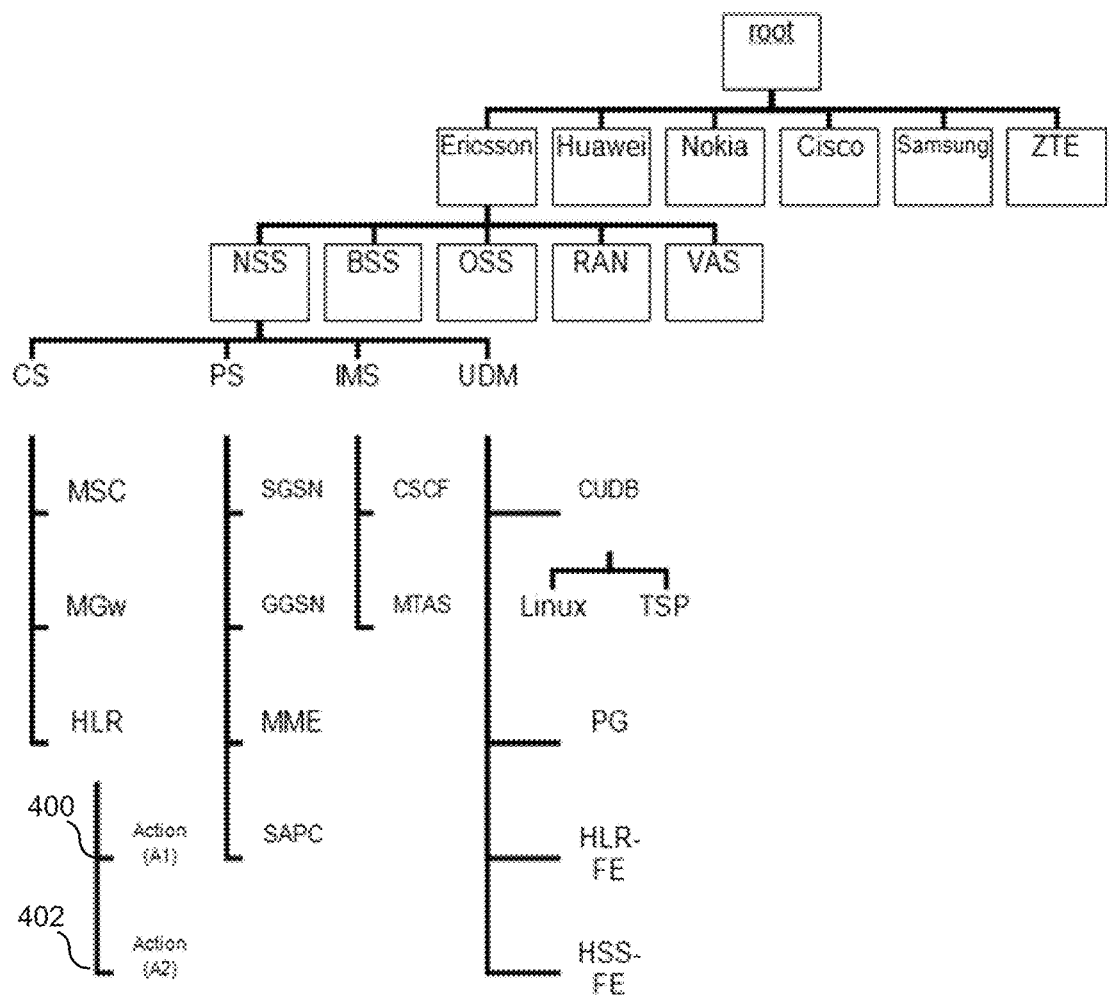
FIG. 4. illustrates an exemplary diagram of a database structure according to some embodiments.

FIG. 4 illustrates an embodiment of a database structure of the object database 175, according to some embodiments. As illustrated in FIG. 4, the database structure is a hierarchical structure that includes a root node, where the next level of nodes below the root node is organized according to an equipment manufacturer. However, it is understood by one of ordinary skill in the art that embodiments are not limited to this particular database structure where any desired database structure known to one of ordinary skill in the art may be implemented. For example, the branching in a database structure can be implemented based on platforms such as Unix, Linux, CPP, WPP, AXE, TSP, etc.). The database structure may take into account that requests may come from a front end application.

As described above, in some embodiments, the FEA 196 of management server 100 sends queries (e.g., LDAP queries) to object server 102, which in such embodiments may be an LDAP server, and, in response, the object server 102 transmits to FEA 196 a set of one or more objects that match the query. According to some embodiments, a query may specify "root," which means the entire directory structure is downloaded (i.e., all objects listed below root are transmitted to the FEA 196 running on the management server 100). In some embodiments, the query may specify a particular part of a branch. For example, an LDAP query (or other query) may specify a manufacturer (Ericsson) and/or one or more devices associated with the manufacturer, where MOBs corresponding to this search are downloaded to the FEA 196. For example, a query may specify "root, Ericsson, NSS, CS, HLR," which will only download specific MOBs for Ericsson HLR (i.e., MOBs 400 and 402). MOBs may be tagged with version information for update notification so that the FEA can decide whether to update its existing MOB or discard the downloaded MOB.

In some embodiments, modify/add/delete requests come from the FEA 196 in a teach or learning mode where new MOBs can be inserted/deleted into the directory structure, or existing MOBs can be modified. If an existing MOB is updated, the version is also updated, which can be coupled with a notify action where the updated MOB is downloaded (e.g., pushed) to other FEAs running on other management servers. For example, if an entity of a network operator updates a MOB used by another entity of the network operator, the updated MOB is downloaded to an FEA of the another entity.

FIG. 5 illustrates the information elements that may be stored in object database 175 for each MOB. Specifically, FIG. 5 shows two database entries (a.k.a., records), one for each of two MOBs. For example, one entry indicates that a MOB is identified as 12312, is added to the database, and is associated with an initiate backup operation. The MOB illustrated in FIG. 5 may inherit certain data like Connection Protocol from the mother tree (HLR). For example, Ericsson . . . ->HLR may have a default connection protocol such as SSH and a platform such as AXE. If a different connection protocol is to be used, a separate child may be created under "HLR" as in the case of "CUDB," where there are 2 different platforms (Linux and TSP). Also the connection protocol may entail other details of sending a command to a service network device such as waiting for prompt "<" when sending a command to an AXE network device while sending multiple commands or during decision making after receipt of a command response.

FIG. 6 illustrates an embodiment of an action menu displayed to a user. This menu may be displayed by a FEA 196 on the management server 100. As illustrated in FIG. 6, the action menu specifies network devices SP1-SP8. Upon selection of network device SP8, the available actions for SP8 may be displayed (e.g., backup, restore, alarms, etc.) (i.e., a set of menu items are displayed where each menu item corresponds to a specific operation). It is understood by one of ordinary skill in the art that the embodiments are not limited to the action menu illustrated in FIG. 6, and the menu can be implemented with any desired configuration.

The "Enter Teach Mode" menu option enables users of FEA 196 to add MOBs to the object database 175. The "Update MOB" menu option enables a user of the FEA 196 update MOBs that already exist in database 175. The "AVAILABLE_ACTIONS" menu option illustrates the MOBs that the FEA 196 received from the object sever 102. These actions may be specific for the particular service network device in question.

According to some embodiments, when a network device is initially connected to a network, the management server 100 may not have any MOBs associated with that network device. In such a scenario, a user may use FEA 196 to cause management server 100 to submit to object server 102 a query specifying the equipment manufacturer and equipment type of the network device 111. If the database 175 contains MOBs for network device 111 specified in the query, the object server 102 will forward the MOBs to the management server 100.

Figure 7:
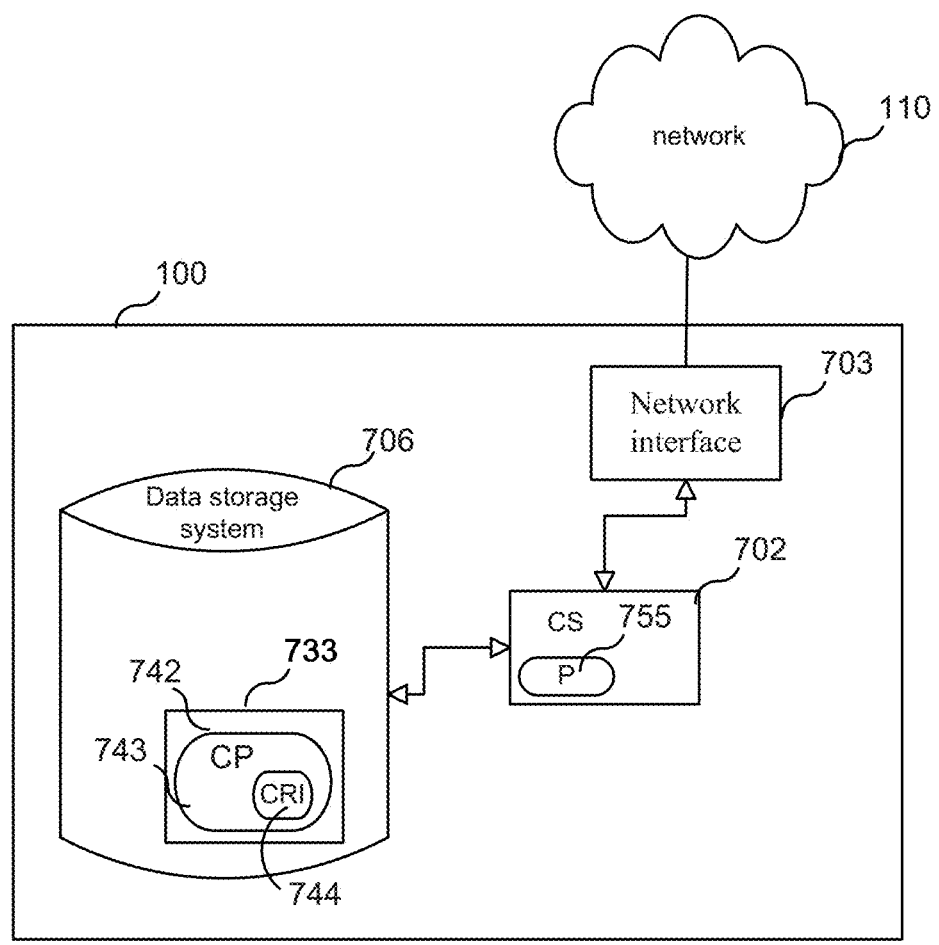
FIG. 7 illustrates and exemplary server according to some embodiments.

FIG. 7 is a block diagram of an embodiment of the management server 100. It is understood by one of ordinary skill in the art that this block diagram is applicable to the object server 102 as well. As shown in FIG. 7, management server 100 may include or consist of: a computer system (CS) 702, which may include one or more processors 755 (e.g., a general purpose microprocessor) and/or one or more circuits, such as an application specific integrated circuit (ASIC), field-programmable gate arrays (FPGAs), a logic circuit, and the like; a network interface 703 for use in connecting management server 100 to a network 110; and a data storage system 706, which may include one or more non-volatile storage devices and/or one or more volatile storage devices (e.g., random access memory (RAM)). In embodiments where management server 100 includes a processor 755, a computer program product (CPP) 733 may be provided. CPP 733 includes or is a computer readable medium (CRM) 742 storing a computer program (CP) 743 comprising computer readable instructions (CRI) 744. CRM 742 is a non-transitory computer readable medium, such as, but not limited to, magnetic media (e.g., a hard disk), optical media (e.g., a DVD), solid state devices (e.g., random access memory (RAM), flash memory), and the like. In some embodiments, the CRI 744 of computer program 743 is configured such that when executed by computer system 702, the CRI causes the management server 100 to perform steps described above (e.g., steps described above with reference to the flow charts and message flows shown in the drawings). In other embodiments, management server 100 may be configured to perform steps described herein without the need for a computer program. That is, for example, computer system 702 may consist merely of one or more ASICs. Hence, the features of the embodiments described herein may be implemented in hardware and/or software.

The advantages of the embodiments disclosed herein include, but are not limited to: decreased cost of maintenance of different products from different vendors, increased efficiency of maintenance of different products from different vendors, decreased cost and time for development of products by equipment manufacturers, decreased cost of maintenance of the developed products in after-sale support phase for equipment manufacturers, flexibility and simplicity in daily O&M routines, and a MVMS is easier to operate and provided at a lower cost. Both network operators and equipment manufacturers benefit from the embodiments disclosed herein.

As used herein a "server" is a set of one or more physical machines (e.g., personal computers, server computers, blade servers, etc.), which machines may be co-located or distributed, that function to provide a service. Each such physical machine may execute the same or a different set of application programs, such as a hypertext transfer protocol (HTTP) server program, which is commonly referred to as a "web server." Additionally, each such physical machine may execute one or more virtual machines.

While various embodiments of the present disclosure have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

IG—Intelligent GUI
DIT—Directory Information Tree
O&M—Operation and Maintenance
OEM—Original Equipment Manufacturer
NSN—Nokia Solutions and Networks
ALU—Alcatel Lucent Networks
MVMS—Multi Vendor Managed Services
IN—Intelligent Network
MPBN—Mobile Packet Backbone Network
RAN—Radio Access Network
2G/3G/4G—2nd/3rd/4th generation networks
R&D—Research and Development
GUI—Graphical User Interface
OS—Operating Interface
IG—Intelligent GUI (Novel)
OMC—O&M Cloud (Novel)
MOB—O&M Object (Novel)
FEA—Intelligent GUI Front-End Application (Novel)
SP—Serviced Product (Novel)
KPI—Key Performance Index
PM—Performance Management
FM—Fault Management
CM—Configuration Management
LDAP—Light Weight Directory Access Protocol
TCP/TP—Transmission Control Protocol/Internet Protocol
NSS—Network Support System
BSS—Business Support System
OSS—Operation Support System
VAS—Value Added Services
CS—Circuit Switched
PS—Packet Switched
IMS—IP Multimedia System
UDM—User Data Management
MSC—Mobile Switching Centre
MGw—Media Gateway
HLR—Home Location Register
FE—Front End
SGSN—Serving GPRS support Node
GGSN—Gateway GPRS Support Node
MME—Mobility Management Identity
SNMP—Simple Network Management Protocol
SAPC—Service Aware policy Control
CSCF—Call Session Control Function
MTAS—Multifunctional Telecommunication Addressing System
CUDB—Central User Data Base
TSP—Telecom Service Platform
PG—Provisional Gateway
CPP—Connectivity Packet Platform
WPP—Wireless Packet platform
AXE—Ericsson Switching

The invention claimed is:

1. A method for managing a plurality of network devices, including a first network device and a second network device that is different than the first network device, the method comprising:
a management server transmitting a request message via a network to an object server located remotely from the management server, the request message comprising information about the first network device, the management server comprising one or more computers, wherein the object server is coupled to an object database storing i) a first management object associated with the information about the first network device and ii) a second management object associated with information about the second network device that is different than the first network device, and the object server is configured such that, after receiving the request message, the object server uses the information about the first network device to retrieve from the object database the first management object and the object server transmits to the management server the retrieved first management object in response to the request message;
the management server receiving the first management object transmitted by the object server in response to the request message, wherein the first management object transmitted by the object server in response to the request message comprises: i) information identifying a device management action and ii) a script comprising a command string for use in commanding the first network device to perform the identified device management action;
after receiving the first management object, the management server displaying to a user an action menu comprising a menu item associated with the first network device and with the script included in the first management object for use in commanding the first network device to perform the identified device management action;
the management server receiving an indication that the user selected the menu item; and
the management server, after and in response to receiving the indication that the user selected the menu item, executing the script, wherein executing the script comprises transmitting to the first network device the command string included in the script, wherein
the first management object further comprises an expected prompt string, and
the method further comprises:
the management server, in response to receiving the indication that the user selected the menu item, transmitting a TCP connection request to the first network device to establish a TCP connection with an application running on the first network device;
the management server receiving, over the TCP connection and from the application, a prompt string;
the management server comparing the received prompt string with the expected prompt string to determine if they are identical; and
as a result of determining that the received prompt string is identical to the expected prompt string, the management server transmitting the command string over the TCP connection to the application running on the network device.

2. The method of claim 1, wherein the information about the first network device comprises information identifying the make of the first network device.

3. The method of claim 2, wherein the information about the first network device further comprises information identifying the model of the first network device.

4. The method of claim 1, wherein
the object database further stores a third management object associated with the information about the first network device, and
the method further comprises:
the management server receiving a third management object from the object server, the second management object comprising: i) information identifying a second device management action and ii) a second script comprising a second command string for use in commanding the first network device to perform the identified second device management action;

in response to receiving the second management object, the management server adding to the action menu a second menu item associated with the first network device and with the second script;

the management server receiving a second indication that a user selected the second menu item; and the management server, in response to receiving the second indication, transmitting to the first network device the second command string.

5. The method according to claim 1, further comprising:
the management server displaying an object creation menu for creating a user specified object associated with the first network device;
the management server receiving one or more command strings for inclusion in the user specified object; and
the management server transmitting the user specified object to the object server.

6. The method according to claim 1, further comprising the management server displaying a selectable user interface element associated with the first network device, wherein
the management server displays the action menu in response to a selection of the user interface element.

7. The method according to claim 1, wherein
the received first management object further comprises a protocol identifier identifying a communication protocol, and
the command string is transmitted to the first network device using the communication protocol specified by the protocol identifier included in the first management object.

8. The method according to claim 1, wherein
the first management object further comprises a TCP port number and an expected prompt string, and
the method further comprises:
the management server, in response to receiving the indication that the user selected the menu item, transmitting a TCP connection request to the first network device to establish a TCP connection with an application running on the first network device, the TCP connection request comprising the TCP port number;
the management server receiving, over the TCP connection and from the application, a prompt string;
the management server comparing the received prompt string with the expected prompt string to determine if they are identical; and
as a result of determining that the received prompt string is identical to the expected prompt string, the management server transmitting the command string over the TCP connection to the application running on the network device.

9. The method according to claim 8, wherein
the application is configured to execute an operation identified by the command string and transmit a positive acknowledgement string back to the management server in response to successfully executing the operation, and
the method further comprises the management server comparing received positive acknowledgement string to an expected positive acknowledgement string included in the first management object to determine whether the operation was successfully performed.

10. A management server for managing a plurality of network devices, including a first network device and a second network device that is different than the first network device, the management server comprising:
a processor; and
a non-transitory computer readable medium coupled to the processor, said non-transitory computer readable medium containing instructions executable by the processor, wherein the management server is operative to:
transmit, via a network, to a remote object server a request message comprising information about the first network device, wherein the object server is coupled to an object database storing i) a first management object associated with the information about the first network device and ii) a second management object associated with information about the second network device that is different than the first network device, and the object server is configured such that, in response to the request message, the object server uses the information about the first network device to retrieve the first management object from the object database and transmits to the management server the first management object,
receive the first management object transmitted by the object server in response to the request message, wherein the first management object transmitted by the object server in response to the request message comprises: i) information identifying a device management action and ii) a command string for use in commanding the first network device to perform the device management action,
receive an indication that the user selected the menu item, and
after and in response to receiving the indication, execute the script, wherein executing the script causes the management server to transmit to the first network device the command string, wherein
the first management object further comprises an expected prompt string, and
the management server is further operative to:
in response to receiving the indication that the user selected the menu item, transmit a TCP connection request to the first network device to establish a TCP connection with an application running on the first network device;
receive, over the TCP connection and from the application, a prompt string;
compare the received prompt string with the expected prompt string to determine if they are identical; and
as a result of determining that the received prompt string is identical to the expected prompt string, transmit the command string over the TCP connection to the application running on the network device.

11. The management server according to claim 10, wherein the information about the first network device comprises information identifying the make of the first network device.

12. The management server according to claim 11, wherein the information about the first network device further comprises information identifying the model of the first network device.

13. The management server according to claim 12, wherein the management server is configured to manage another network device that is a different make or model than the first network device.

14. The management server according to claim 10, wherein the management server is further operative to:
display an object creation menu for creating a user specified object associated with the first network device, receive one or more command strings for inclusion in the user specified object, and transmit the user specified object to the object server.

15. The management server according to claim 10, wherein the management server is further operative to:

display a selectable user interface element associated with the first network device, and display the action menu in response to a selection of the selectable user interface element.

16. The management server according to claim 10, wherein the received first management object further comprises a protocol identifier identifying a communication protocol, and the management server is configured to transmit the command string to the first network device using the communication protocol specified by the protocol identifier included in the first management object.

17. The management server according to claim 10, wherein the action menu is displayed in a graphical user interface.

18. The management server according to claim 10, wherein the device management action comprises a script that includes the command string.

19. A computer product for managing a plurality of network devices, including a first network device and a second network device that is different than the first network device, the computer product comprising a non-transitory computer readable medium storing computer instructions for:

transmitting, via a network, to a remote object server a request message comprising information about the first network device, the management server comprising one or more computers, wherein the object server is coupled to an object database storing i) a first management object associated with the information about the first network device and ii) a second management object associated with information about the second network device that is different than the first network device, and the object server is configured such that, in response to the request message, the object server uses the information about the first network device to retrieve the first management object from the object database and the object server transmits to the management server the first management object that the object sever retrieved from the object database;

receiving the first management object transmitted by the object server in response to the request message, wherein the first management object transmitted by the object server in response to the request message comprises: i) information identifying a device management action and ii) a command string for use in commanding the first network device to perform the device management action;

after receiving the first management object, displaying to a user an action menu comprising a menu item associated with the first network device and with the device management action;

receiving an indication that the user selected the menu item; and after and in response to receiving the indication, executing the script, wherein executing the script comprises transmitting to the first network device the command string included in the script, wherein the first management object further comprises an expected prompt string, and the computer readable medium further stores computer instructions for:

transmitting a TCP connection request to the first network device to establish a TCP connection with an application running on the first network device in response to receiving the indication that the user selected the menu item;

receiving, over the TCP connection and from the application, a prompt string;

comparing the received prompt string with the expected prompt string to determine if they are identical; and transmitting the command string over the TCP connection to the application running on the network device as a result of determining that the received prompt string is identical to the expected prompt string.

20. The computer product according to claim 19, wherein the computer readable medium further stores instructions for:

displaying an object creation menu for creating a user specified object associated with the first network device, receiving one or more command strings for inclusion in the user specified object, and transmitting the user specified object to the object server.

21. The method of claim 1, wherein the first management object further comprises a TCP port number, and the method further comprises:

the management server, in response to receiving the indication that the user selected the menu item, transmitting a TCP connection request to the first network device to establish a TCP connection with an application running on the first network device, the TCP connection request comprising the TCP port number.

* * * * *